(12) United States Patent
Chen et al.

(10) Patent No.: US 12,596,465 B2
(45) Date of Patent: Apr. 7, 2026

(54) INFORMATION PROCESSING METHOD, ELECTRONIC DEVICE, AND STORAGE MEDIUM

(71) Applicant: Douyin Vision Co., Ltd., Beijing (CN)

(72) Inventors: Kehong Chen, Beijing (CN); Yang Wang, Beijing (CN)

(73) Assignee: Douyin Vision Co., Ltd., Beijing (CN)

( * ) Notice: Subject to any disclaimer, the term of this patent is extended or adjusted under 35 U.S.C. 154(b) by 181 days.

(21) Appl. No.: 18/456,171

(22) Filed: Aug. 25, 2023

(65) Prior Publication Data

US 2024/0069690 A1     Feb. 29, 2024

(30) Foreign Application Priority Data

Aug. 26, 2022    (CN) .......................... 202211035812.0

(51) Int. Cl.
*G06F 3/0482* (2013.01)
*G06F 9/451* (2018.01)
*G06Q 50/00* (2024.01)

(52) U.S. Cl.
CPC ............ *G06F 3/0482* (2013.01); *G06F 9/451* (2018.02); *G06Q 50/01* (2013.01)

(58) Field of Classification Search
CPC .... G06F 3/0482; G06F 9/451; G06F 3/04847; G06F 16/9536; G06Q 50/01
See application file for complete search history.

(56) References Cited

U.S. PATENT DOCUMENTS 9,275,419 B1     3/2016 Aguiar Marcano
9,647,872 B2 *   5/2017 Appelman .............. H04L 51/04

9,798,832 B1 *  10/2017 Lessin ................. G06F 16/9024
2007/0174389 A1 *  7/2007 Armstrong ............. G06Q 50/01
                                                        709/204
2013/0103758 A1 *  4/2013 Alison ................... G06Q 30/02
                                                        709/204
2014/0317565 A1   10/2014 Bergmans
2017/0351767 A1   12/2017 Suzuki et al.
(Continued)

FOREIGN PATENT DOCUMENTS

CN          102929539 A       2/2013
CN          105187237 A      12/2015
(Continued)

OTHER PUBLICATIONS

International Search Report in mailed Nov. 13, 2023 in PCT Appl. No. PCT/CN2023/114434, English translation (18 pages).
European Search Report for EP Patent Application No. 23856654.1, Issued on Mar. 25, 2025, 8 pages.
"1Why do users recommend Instagram? How to hide! ?", Retrieved from the link: "https:/web.archive.orgwe/22818/-ybos.conta-userad-24", 2025, pp. 1-10.
(Continued)

*Primary Examiner* — Cao H Nguyen

(57)          ABSTRACT

Provided are an information processing method, an electronic device, and a storage medium. The method includes the following: in response to a trigger instruction from a current user for a first user in an association user list, the association user list is dynamically updated and displayed; where the association user list corresponds to the current user, and the step in which the association user list is dynamically updated includes that at least one second user is determined according to the first user, and the association user list is updated based on the at least one second user; where the at least one second user is associated with the first user.

19 Claims, 11 Drawing Sheets

(56) References Cited

U.S. PATENT DOCUMENTS

| | | | |
|---|---|---|---|
| 2019/0052720 A1 | 2/2019 | Guo et al. |
| 2019/0354562 A1 | 11/2019 | Gan |

FOREIGN PATENT DOCUMENTS

| | | | |
|---|---|---|---|
| CN | 105843465 A | 8/2016 |
| CN | 106033296 A | 10/2016 |
| CN | 108353019 A | 7/2018 |
| CN | 109558465 A | 4/2019 |
| CN | 110807157 A | 2/2020 |
| CN | 111814067 A | 10/2020 |
| CN | 113886725 A | 1/2022 |
| JP | 2001-313745 A | 11/2001 |
| JP | 2016-535900 A | 11/2016 |
| JP | 2021-002824 A | 1/2021 |
| WO | 2016/111065 A1 | 7/2016 |

OTHER PUBLICATIONS

"What is a recommended account? What are the criteria and how to hide it?", W Tweet f Share, Retrieved from the link: "http: // www.sclila.omosiniarcomomd - ers - count", 2007, pp. 1-18.

Office action received from Japanese patent application No. 2025-512121 mailed on Jul. 8, 2025, 10 pages (5 pages English Translation and 5 pages Original Copy).

Office action received from Chinese patent application No. 202211035812.0 mailed on Nov. 11, 2025, 20 pages (10 pages English Translation and 10 pages Original Copy).

Office action received from Japanese patent application No. 2025-512121 mailed on Sep. 24, 2025, 6 pages (6 pages English Translation and 6 pages Original Copy).

Office action received from Chinese patent application No. 202211035812.0 mailed on Feb. 4, 2026, 18 pages (9 pages English Translation and 9 pages Original Copy).

* cited by examiner

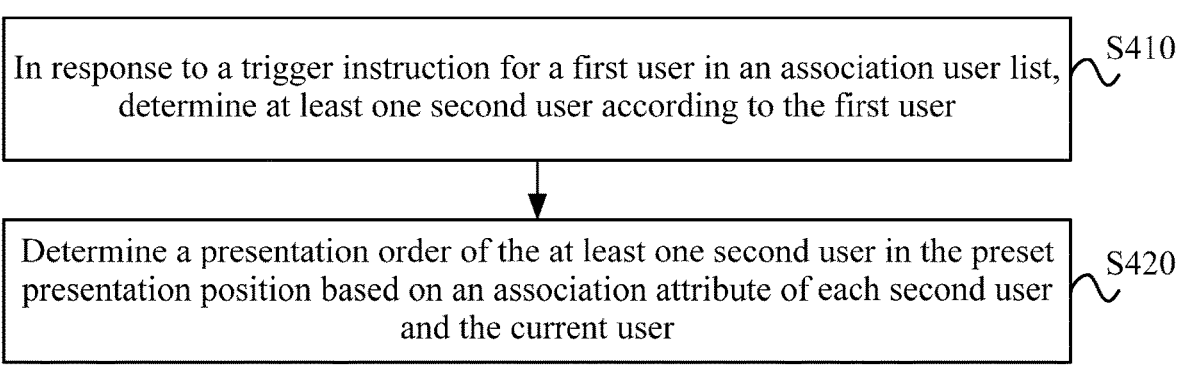

In response to a trigger instruction for a first user in an association user list, determine at least one second user according to the first user ⌇S410

Determine a presentation order of the at least one second user in the preset presentation position based on an association attribute of each second user and the current user ⌇S420

FIG. 12

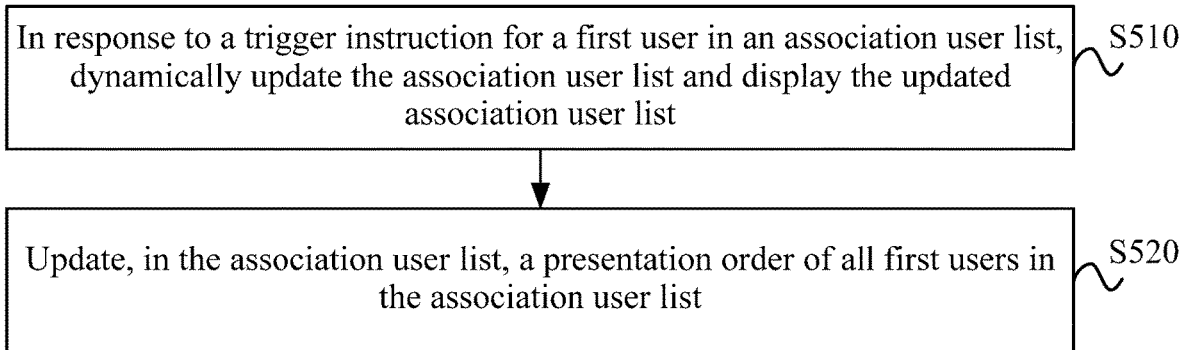

In response to a trigger instruction for a first user in an association user list, dynamically update the association user list and display the updated association user list ⌇S510

Update, in the association user list, a presentation order of all first users in the association user list ⌇S520

FIG. 13

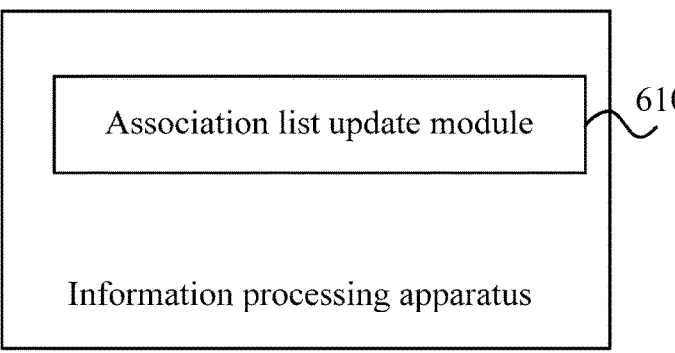

Association list update module ⌇610

Information processing apparatus

FIG. 14

INFORMATION PROCESSING METHOD, ELECTRONIC DEVICE, AND STORAGE MEDIUM

CROSS-REFERENCE TO RELATED APPLICATIONS

This application claims priority to Chinese patent application No. 202211035812.0 filed with the China National Intellectual Property Administration (CNIPA) on Aug. 26, 2022, the disclosure of which is incorporated herein by reference in its entirety.

TECHNICAL FIELD

Embodiments of the present disclosure relate to information processing technologies, and in particular, an information processing method, an electronic device, and a storage medium.

BACKGROUND

With the development of network technologies, more and more application programs have entered the life of users, particularly, a series of entertainment platforms on which users may publish information and pay attention to other users are very popular with the users.

To further improve the use experience of users, a corresponding user may be pushed to the current user, and an existing pushing manner mainly screens out a user associated with the user attribute of the current user from large quantities of users and then pushes the user to the current user.

The above-described manner has the disadvantages that a calculation amount is relatively large, the corresponding calculation cost is relatively high, and further, the effect of a real-time push cannot be achieved due to the large calculation amount.

SUMMARY

The present disclosure provides an information processing method and apparatus, an electronic device, and a storage medium, so that a second user associated with the current user may be conveniently determined in real time and displayed on a display interface, and the effect of convenience and reliability in determining the second user is improved.

An embodiment of the present disclosure provides an information processing method. The method includes that: in response to a trigger instruction from a current user for a first user in an association user list, the association user list is dynamically updated and the updated association user list is displayed; where the association user list corresponds to the current user, and the step in which the association user list is dynamically updated includes that at least one second user is determined according to the first user and the association user list is updated based on the at least one second user; where the at least one second user is associated with the first user.

An embodiment of the present disclosure further provides an information processing apparatus. The apparatus includes an association list update module. The association list update module is configured to dynamically update the association user list and display the updated association user list, in response to a trigger instruction from a current user for a first user in an association user list, where the association user list corresponds to the current user, and the association list update module is configured to dynamically update the association user list and display the updated association user list in the manner that at least one second user is determined according to the first user and the association user list is updated based on the at least one second user; where the at least one second user is associated with the first user.

An embodiment of the present application further provides an electronic device. The electronic device includes one or more processors and a storage apparatus. The storage apparatus is configured to store one or more programs. The one or more programs, when executed by the one or more processors, cause the one or more processors to implement the information processing method described in any one of the embodiments of the present disclosure.

An embodiment of the present application further provides a storage medium including a computer-executable instruction, where the computer-executable instruction is configured to, when executed by a computer processor, perform the information processing method described in any one of the embodiments of the present disclosure.

According to the technical schemes of the embodiments of the present disclosure, in response to the trigger instruction for the first user in the association user list, the association user list is dynamically updated and the updated association user list is displayed, so that a relatively large calculation amount, a relatively high calculation cost and a relatively poor real-time performance because a user associated with the current user needs to be determined from mass data in the related art can be avoided, and thus the technical effect of improving the real-time performance of determining the second user on the basis of reducing the calculation amount is achieved.

BRIEF DESCRIPTION OF DRAWINGS

The above and other features, advantages and aspects of embodiments of the present disclosure will become more apparent by referring to the following detailed description when taken in conjunction with the accompanying drawings. Throughout the drawings, the same or similar reference numbers refer to the same or similar elements. It should be understood that the drawings are schematic and that components and elements are not necessarily drawn to scale.

FIG. 12 is a schematic flowchart of an information processing method according to an embodiment of the present disclosure;

FIG. 13 is a schematic flowchart of an information processing method according to an embodiment of the present disclosure;

FIG. 14 is a schematic structural diagram of an information processing apparatus according to an embodiment of the present disclosure.

DETAILED DESCRIPTION

Figure 1:
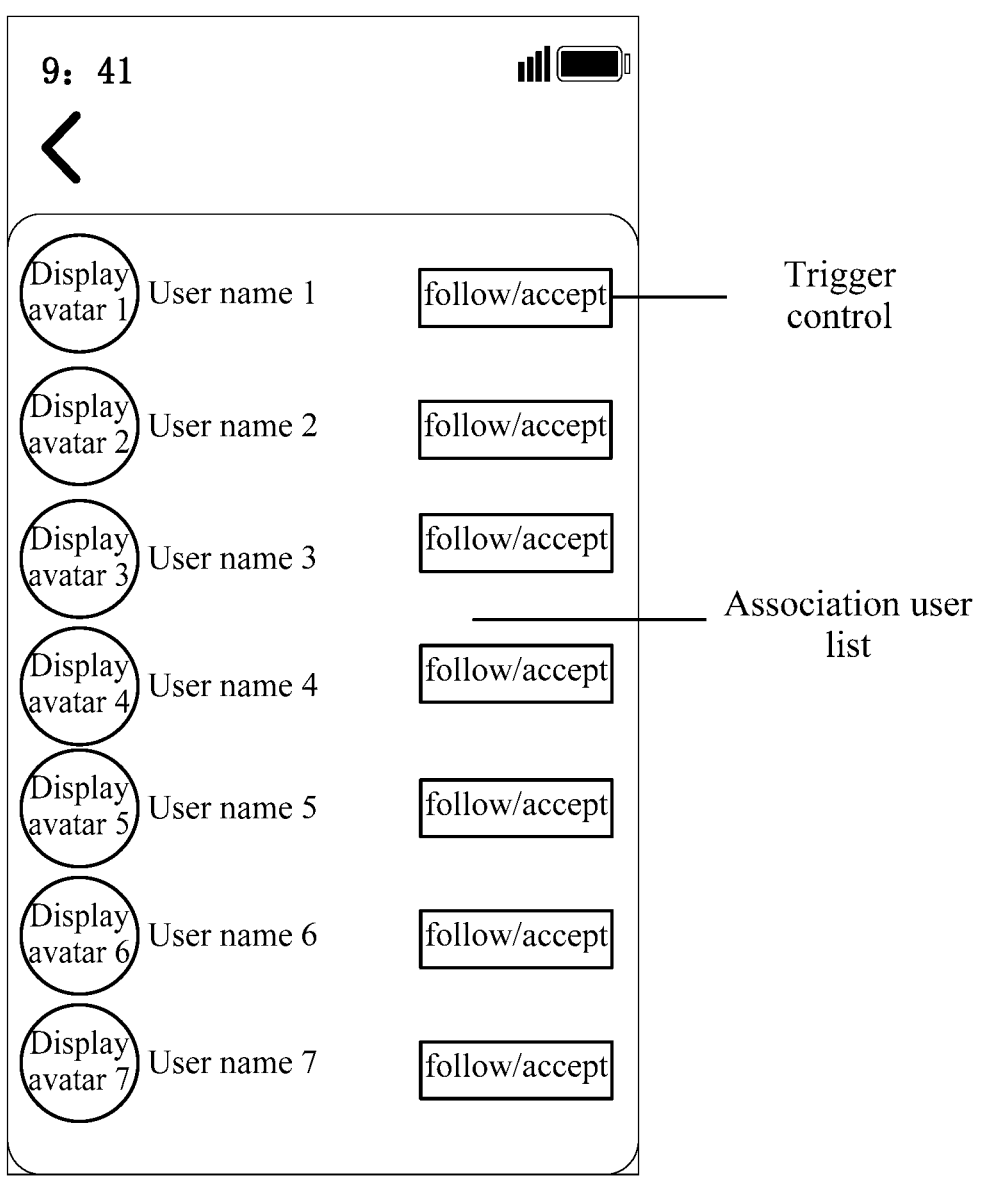
FIG. 1 is a display page corresponding to a current user according to an embodiment of the present disclosure.

Embodiments of the present disclosure will be described in more detail below with reference to the accompanying drawings. While certain embodiments of the present disclosure are shown in the accompanying drawings, it should be understood that the present disclosure may be embodied in various forms and should not be construed as limited to the embodiments set forth herein, but rather these embodiments are provided for a more thorough and complete understanding of the present disclosure. It should be understood that the accompanying drawings and the embodiments of the present disclosure are for illustrative purposes only and are not intended to limit the scope of protection of the present disclosure.

It should be understood that various steps recited in method embodiments of the present disclosure may be executed in a different order, and/or in parallel. Moreover, the method embodiments may include additional steps and/or omit performing the illustrated steps. The scope of the present disclosure is not limited in this regard.

The term "include" and variations thereof as used herein are intended to be open-ended, i.e., "including but not limited to". The term "based on" is "based at least in part on". The term "an embodiment" means "at least one embodiment"; the term "another embodiment" means "at least one further embodiment"; the term "some embodiments" means "at least some embodiments". Relevant definitions for other terms will be given in the following description.

It should be noted that the concepts referred to in the present disclosure such as "first" and "second" are merely used for distinguishing different apparatuses, modules, or units, and are not used for limiting the order or interdependence of functions performed by such apparatuses, modules, or units.

It should be noted that modifications referred to in the present disclosure such as "a" or "multiple" are intended to be illustrative rather than limiting, it should be understood by those skilled in the art that the term "one or more" will be used unless the context clearly indicates otherwise.

The names of messages or information interacted between multiple apparatuses in the embodiments of the present disclosure are for illustrative purposes only and are not used for limiting the scope of such messages or information.

It should be understood that before the technical schemes disclosed in the embodiments of the present disclosure are used, users should be informed and authorized as to the type of personal information, scope of use, context of use, etc., to which the present disclosure relates in an appropriate manner in compliance with relevant laws and regulations.

For example, in response to receiving an active request of a user, prompt information is sent to the user to explicitly prompt the user that an operation requested by the user may require acquisition and use of personal information of the user, so that the user may autonomously select whether to provide the personal information to software or hardware such as an electronic device, an application program, a server, or a storage medium performing operations of the technical schemes of the present disclosure according to the prompt information.

As an alternative but non-limiting implementation, the manner in which the prompt information is sent to the user in response to receiving the active request of the user may be, for example, a pop-up window manner, and the prompt information may be presented in text in a pop-up window. Moreover, the pop-up window may also carry a selection control for the user to select "agree" or "disagree" to provide the personal information to the electronic device.

It should be understood that the above process of notifying and acquiring user authorization is merely illustrative and does not constitute the limitation on the implementation of the present disclosure, and that other manners of satisfying the relevant laws and regulations may also be applied to implementations of the present disclosure.

It should be understood that the data (including, but not limited to, the data itself, the acquisition or use of the data) to which the technical schemes relate should comply with the requirements of the respective laws and regulations and relevant regulations.

Before the technical schemes are introduced, an application scenario may be exemplarily illustrated. The technical schemes of the embodiments of the present disclosure may be applied in an arbitrary scenario where a user requires to be recommended, for example, in a process of browsing contents published by other users based on a relevant application program or application software, a particular user is determined to be followed based on a trigger instruction of the user, an association relationship between association users of the particular user and the current user is determined based on information about the association users, and an association user of the particular user is recommended for the current user, whereby a recommended user list is generated, and the recommended user list is displayed on a display interface.

The embodiments of the present disclosure are suitable for use in an arbitrary scenario where a user requires to be recommended, for example, a scenario of user recommendation on a social platform, the method may be performed by an information processing apparatus, the apparatus may be implemented in a form of software and/or hardware, in an embodiment, the apparatus may be implemented by an electronic device, and the electronic device may be a mobile terminal, a personal computer (PC) side, a server, or the like. Implementations of the embodiments of the present disclosure may be performed by a service side or by a client side, or by the service side and the client side in cooperation. The information processing method in the embodiments of the present disclosure may be as follows: in response to a trigger instruction from a current user for a first user in an association user list, the association user list is dynamically updated and displayed, where the association user list corresponds to the current user, the step in which the association user list is dynamically updated includes that at least one second user is determined according to the first user and the association user list is updated based on the at least one second user; where the at least one second user is associated with the first user.

It should be noted that the apparatus performing the information processing method provided in the embodiments of the present disclosure may be integrated in application software supporting a user recommendation function, the software may be installed in the electronic device, and in an embodiment, the electronic device may be a mobile terminal, a PC side, or the like. The application software may be any type of social software, which is not repeatedly described here, as long as it has the function of following a user. The application software may also be a specially developed application program, i.e., software that enables the follow function between users, or the application software is integrated in a corresponding page, and the user may follow other users through the page integrated on the PC side.

According to this embodiment, in the application software or application program supporting the function of following other users, a control for triggering the follow function may be developed in advance, when it is detected that a user triggers the control, a follow trigger instruction is responded to enable the user currently operating the software to follow other users, and the follow control may be a "follow" key or an "accept" key.

All users registered with an account on the social platform may be the current user, and the number of current users may be more than one, and one of the multiple users may be exemplified and used as the above-mentioned current user for clarity in describing the technical schemes provided in the embodiments of the present disclosure. When the current user triggers the application program and clicks on a follow list control, a follow user list interface may be entered, and at this time, a list presented on a page of the device may be the association user list. A user located on the follow user list interface at this time is the first user, i.e., the first user is a user on the follow list interface of the current user, and the first user may be a user determined by using a correlation algorithm, in whom the current user is interested and which the current user wants to follow. When a user currently triggered is in the association user list, users in the association user list are dynamically updated, and the users presented in the association user list may be adjusted or added. For example, an original user presentation position in the list may be adjusted; alternatively, the user may be newly added and display positions of all users in the entire list are adjusted. The second user may be determined based on the first user, and the second user must be some users co-associated with the current user and the first user.

In this embodiment, after the current user triggers a follow control to follow the first user, how to determine the second user according to the first user will be explained in detail.

In an actual application process, when the current user triggers the application program and enters an association user list interface, multiple first users in whom the current user is interested and that the current user wants to follow are contained in the association user list interface and are determined according to an algorithm. A trigger control corresponding to each first user immediately follows behind the first user, referring to FIG. 1. A user may trigger a control corresponding to the first user, and the content corresponding to the control may be "follow/accept". When it is detected that the user triggers the trigger control corresponding to a certain first user, it represents that the current user has followed the first user corresponding to the current control, further, the second user is determined according to the first user followed by the current user, and the users presented in the association user list are adjusted based on trigger information of the current user, for example, the original presentation position of the first user in the list may be adjusted, or some second users are added and display positions of all users in the entire list are adjusted.

Figure 2:
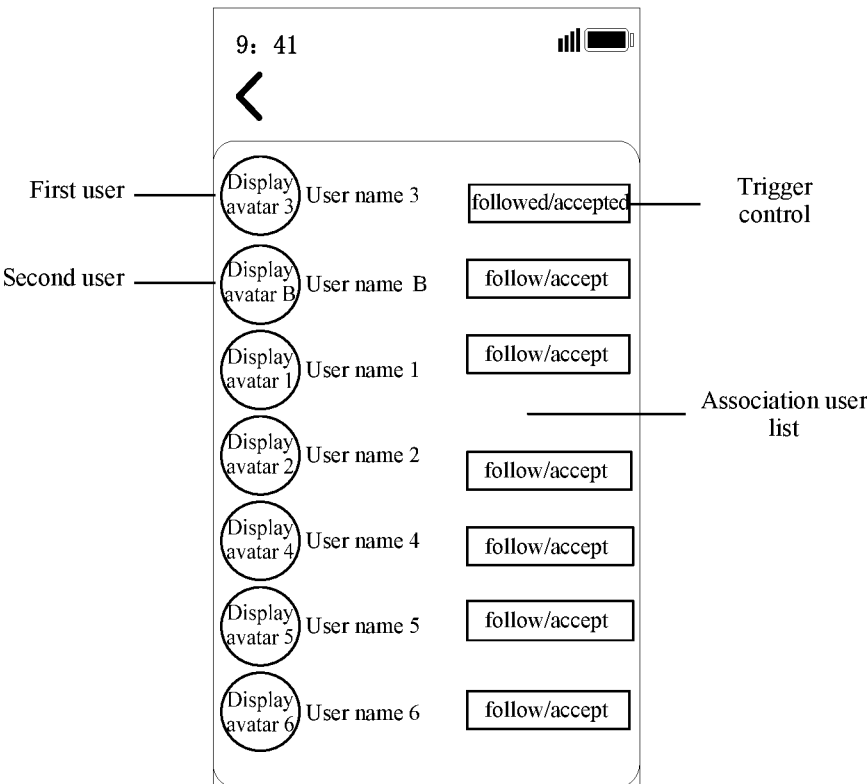
FIG. 2 is a schematic diagram of a corresponding display page after a current user triggers a follow control according to an embodiment of the present disclosure.
Figure 3:
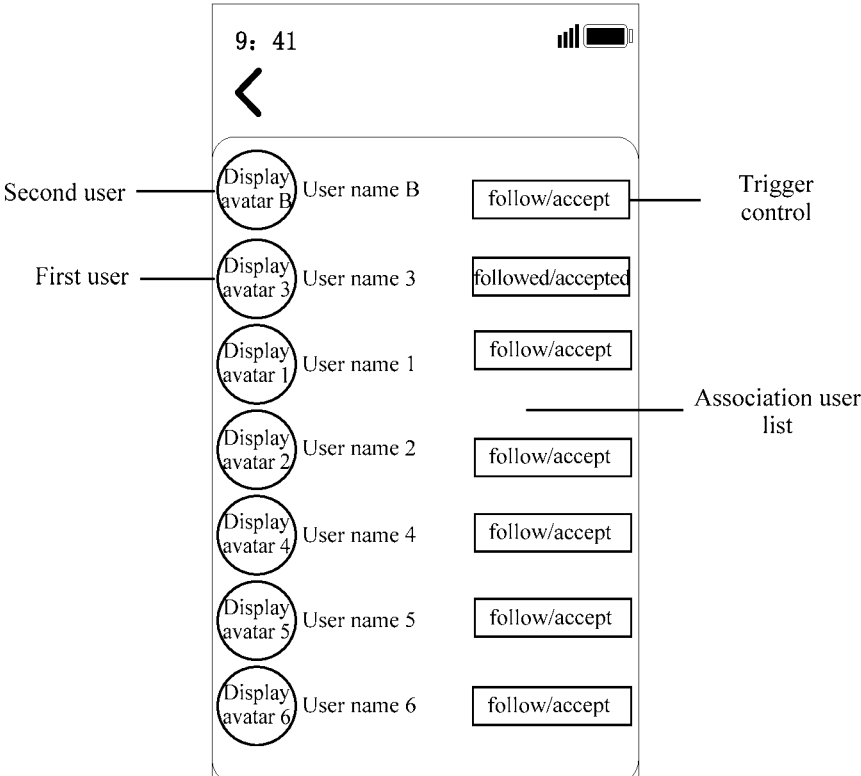
FIG. 3 is a schematic diagram of an interface on which a second user is presented in an association user list according to an embodiment of the present disclosure.
Figure 4:
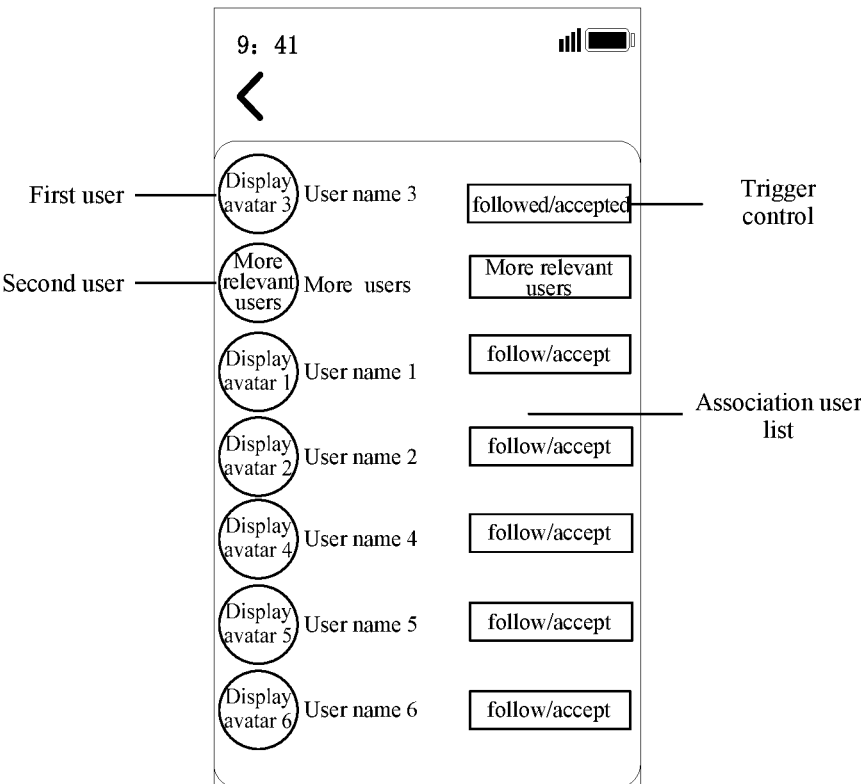
FIG. 4 is a schematic diagram of an interface on which a second user is presented in an association user list according to an embodiment of the present disclosure.
Figure 5:
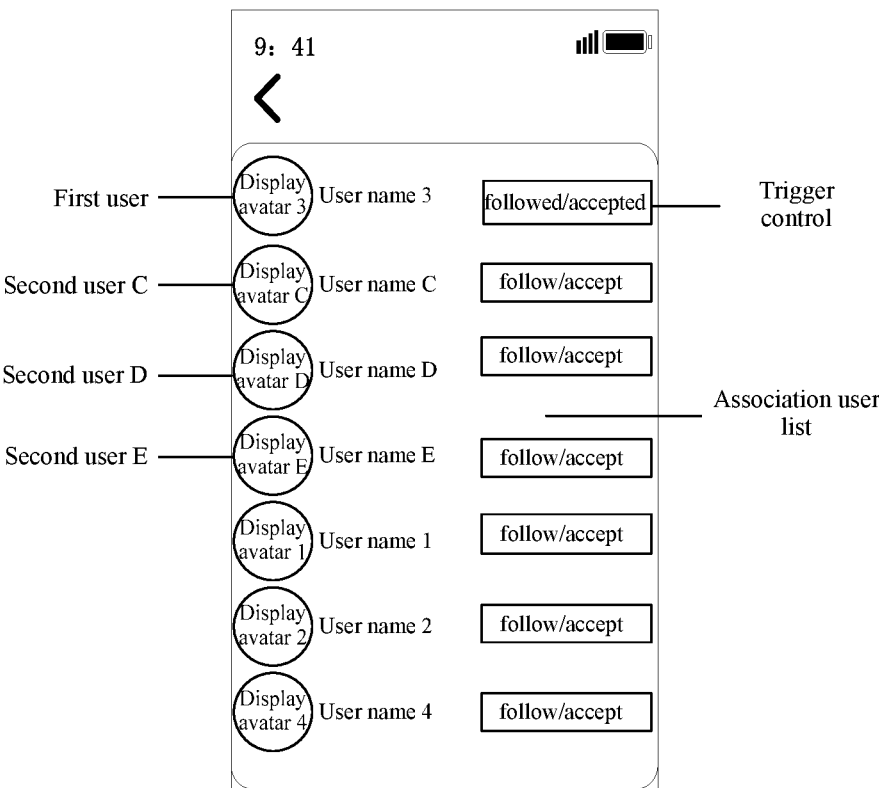
FIG. 5 is a schematic diagram of an interface on which a second user is presented in an association user list according to an embodiment of the present disclosure.

Exemplarily, when the current user A triggers the application program and enters the association user list interface, the association user list interface displays multiple recommendation users, as shown in FIG. 1. In FIG. 1, first user 1 and first users 2 to 7 in whom the current user is interested and wants to follow are users contained in the association user list interface and are determined according to the algorithm. When the current user A triggers a "follow/accept" control corresponding to the first user 3, it represents that the current user A has followed the first user 3, and the second user is further determined according to the first user 3. Assuming that the first user is located at a position of the third row in the current display page of the association user list, at this time, the first user 3 may move to a position of the first row, that is, in the first row in the association user list, the position of the second user in the association user list immediately follows the display position of the first user, and other second users move one row down, respectively, referring to FIG. 2. The second user determined according to the first user may be one or multiple second users. If the current user A triggers the "follow/accept" control corresponding to the first user 3, and one second user B is determined according to the first user 3, a display position of the second user B in the to-be-followed column may be located below and immediately after the first user 3, as shown in FIG. 2. Alternatively, the second user B may be located above the first user 3, referring to FIG. 3. In the to-be-followed column, display positions of other users originally displayed in the to-be-followed column except the first user 3 are sequentially moved downwards. If there are multiple users having an association relationship with the first user 3 and the current user A, i.e., user C, user D, and user E, display positions of the multiple second users in the to-be-followed column may be used as "more relevant users" as a whole and located at a display position next to the first user on the display page of the association user list, referring to FIG. 4. The "more relevant users" as a whole may also be located at a display position previous to the first user in the association user list, and after a "more relevant users" key is triggered, multiple determined second users may be presented. In addition, user C, user D, and user E may also be respectively located at the display position next to the first user in the association user list as one piece of display information of the recommendation user, referring to FIG. 5.

Alternatively, before the association user list is dynamically updated and displayed in response to the trigger instruction for the first user in the association user list, the method further includes that the association user list corresponding to the current user is determined based on a server recommendation model and the current user attribute of the current user.

In this embodiment, the server recommendation model refers to a pre-trained model that may be deployed in the service side so as to determine some to-be-followed users or some to-be-followed-back users associated with the current user at an initial stage. The current user attribute may be feature data of the current user, for example, the feature data may be some operation behavior data, including browsing behavior data and viewing movie data, or the feature data may be some other data corresponding to some operation behavior used for characterizing a user feature. Since the determination of a user follow list corresponding to each user in the initial stage requires to be performed in combination with integrity data, the computation amount is relatively high at this time, and requirements on the real-time performance are not high, so that users of the association user list in the initial stage may be determined based on the server recommendation model, the benefits of this arrangement include the following: some first users associated with the user may be screened out from a large amount of data, and the comprehensiveness of determined users in the association user list is improved.

In an embodiment, the step in which the association user list is dynamically updated and displayed further includes the following: a follow control corresponding to the first user is updated from first display information to second display information; and a display position of the first user in the association user list is updated.

The second display information is preset and different from the first display information. The first display information may characterize that the current user does not follow the first user. When the follow control is triggered, the first display information is updated to the second display information, a process of updating the display information characterizes that the current user has followed the first user, and the display position of the first user in the association user list is updated while the display information is updated.

Figure 6:
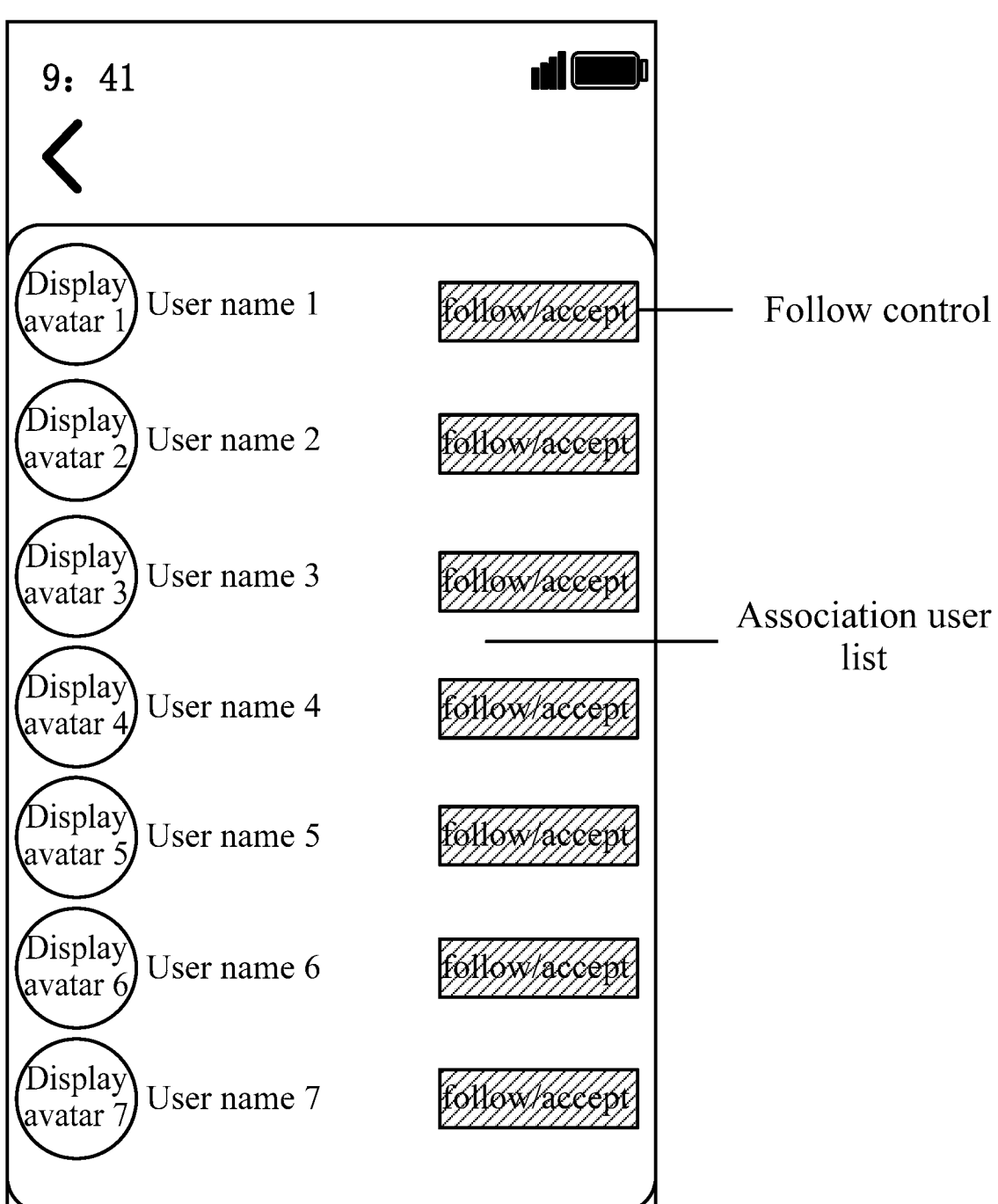
FIG. 6 is a schematic diagram of a display page of first display information according to an embodiment of the present disclosure.
Figure 7:
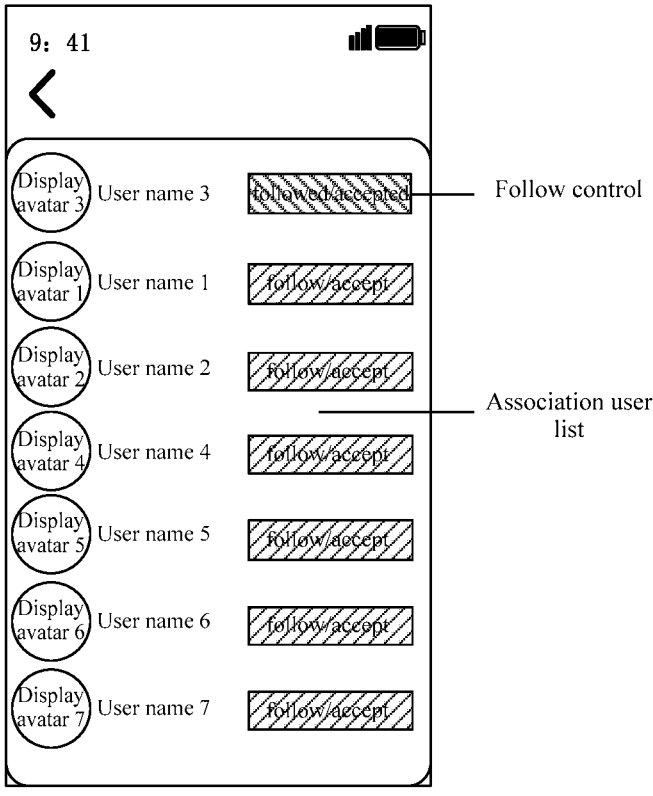
FIG. 7 is a schematic diagram of a display page of second display information according to an embodiment of the present disclosure.

In an actual application, the process of updating the first display information to the second display information may be achieved by changing the color of the follow control such as the "follow/accept" control, exemplarily, when the current user A triggers the application program and enters into the association user list, each first user in the association user list is provided with a corresponding "follow/accept" control, the first display information of the "follow/accept" control may be set to pink, referring to FIG. 6, the follow control is filled in a first filling manner, it represents that the current user A has not followed the first user 3 at this time; when the current user A triggers the "follow/accept" control of the first user 3, the "follow/accept" control turns to green, referring to FIG. 7, the follow control is filled in a second filling manner, this process represents that the current user A has followed the second user 3. The first filling manner is different from the second filling manner. The benefits of this arrangement include the following: after the current user clicks the follow control, the user may clearly know whether the first user has been followed, and the current user can know the followed users in real time.

Furthermore, the step in which the display position of the first user in the association user list is updated includes that the first user is displayed at the top position of the association user list, or that the first user is removed from the association user list.

In this embodiment, when the current user triggers the first user in the association user list, the first user at this time is in a followed state. The display position of the first user in the association user list may be updated in two manners, the first manner is that the first user is still displayed in the association user list, and the second manner is that the first user that has been followed is directly removed from the association user list.

In the first manner, since the position where the first user is located may be located at any display position in the association user list, for example, a position of the first row in the association user list, or a position of the second row in the association user list, or a position of another row in the association user list. When a control for following the first user is triggered, a first user originally located at any display position at the current display page of the association user list is set to the top as the first display position at the current display page. The benefits of this arrangement are as follows: after the current user has followed the first user, the position of the first user is set to the top of the display list, and the display position of the first user is more obvious for the current user. In the second manner, the first user that has been followed is directly removed from the association user list, since the first user at this time has become a user followed by the current user, it is not necessary to perform the follow operation again, and it may not be displayed in the association user list, the benefits of this arrangement are as follows, the presentation space of the association user list is saved, more association users can be recommended, and utilization of the association user list is improved.

According to the technical schemes of the embodiments of the present disclosure, in response to the trigger instruction for the first user in the association user list, the association user list is dynamically updated and the updated association user list is displayed, where the association user list corresponds to the current user, and the step in which the association user list is dynamically updated includes that at least one second user is determined according to the first user and the association user list is updated based on the at least one second user. In this manner, the relatively large calculation amount, the relatively high calculation cost and the relatively poor real-time performance because the user associated with the current user needs to be determined from mass data in the related art can be avoided, thus the technical effect of improving the real-time performance in determining the second user on the basis of reducing the calculation amount is achieved.

Figure 8:
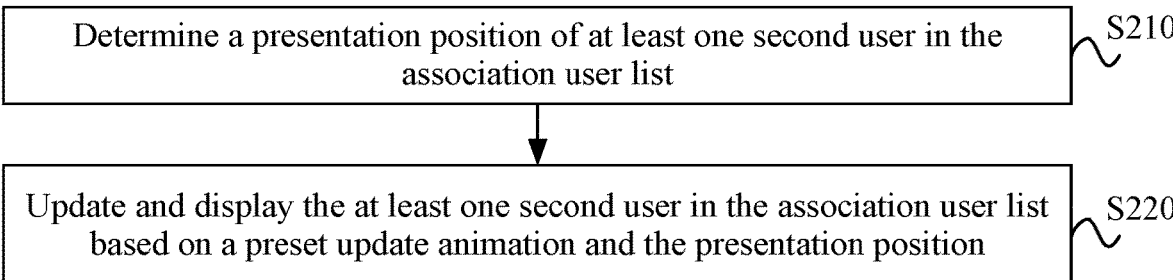
FIG. 8 is a schematic flowchart of an information processing method according to an embodiment of the present disclosure.

FIG. 8 is a schematic flowchart of an information processing method according to an embodiment of the present disclosure, on the basis of the foregoing embodiments, after the current user triggers the first user in the association user list, a generated display position of the second user in the association user list is described in detail, and embodiments thereof may be made to the technical scheme of this embodiment. Technical terms identical or corresponding to those of the above-described embodiments are not repeated here.

In S210, a presentation position of at least one second user in the association user list is determined.

In this embodiment, in a presentation page of the association user list of the current user, a position where the first user is located may be any presentation position at the current presentation page of recommendation users, for example, the position where the first user is located may be the first presentation position of the current association user list, or may be the second presentation position of the current association user list, or may be other presentation positions of the current association user list. The first presentation position is a position of the first row, the second presentation position is a position of the second row, and other presentation positions respectively correspond to positions of other rows in a presentation page of the follow list in order of rows in the presentation page of the association user list. When the current user triggers a trigger control corresponding to the first user, other second users having an association relationship with the first user are determined, some of these other second users have a certain association relationship with the current user at the same time and are used as recommended users, and then other second users that have the association relationship with both the first user and the current user are presented in the presentation page of the association user list. At this time, no matter where the first user is originally located in which display position on the current presentation page of the recommendation users, the position of the second user in the association user list immediately follows after the presentation position of the first user.

In an embodiment, the presentation position is preset in the association user list. The preset presentation position refers to a preset presentation position, that is, the presentation position of the second user is preset to a display position of a row immediately next to the first user, or a display position of a row immediately previous to the first user. In this manner, since the presentation position of the second user is preset, when the user uses this function multiple times, which users are the latest recommended association users can be quickly identified.

Among numerous options of the preset presentation position, the preset presentation position may be set to the top presentation position in the association user list; or the preset presentation position may be set to a display position next to the display position of the first user in the association user list; where the position number of the preset presentation position corresponds to the number of the at least one second user.

Figure 9:
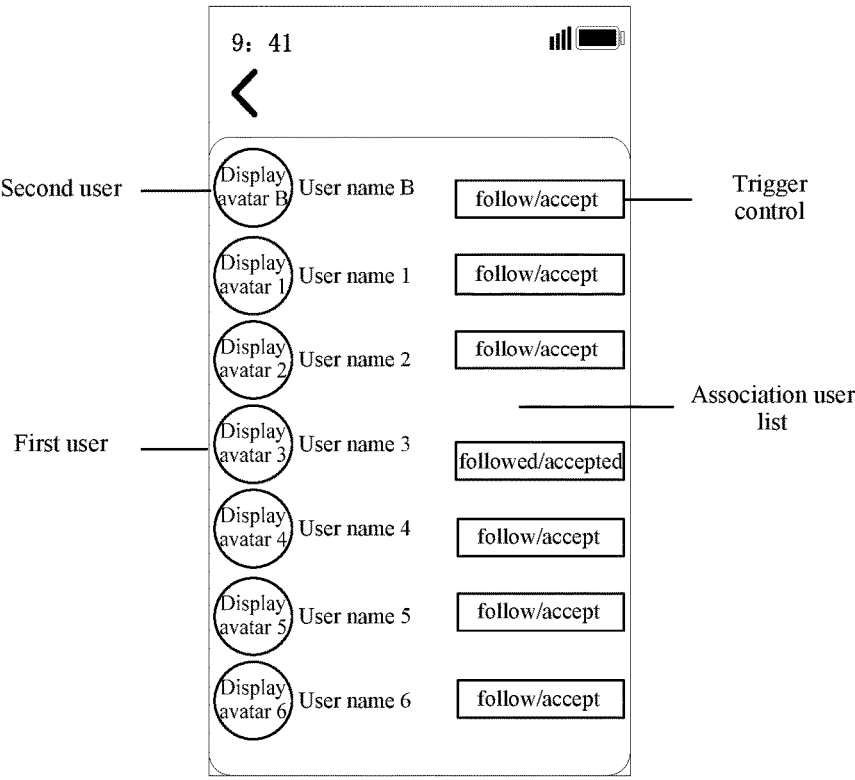
FIG. 9 is a schematic diagram of an interface on which a second user is presented in an association user list according to an embodiment of the present disclosure.
Figure 10:
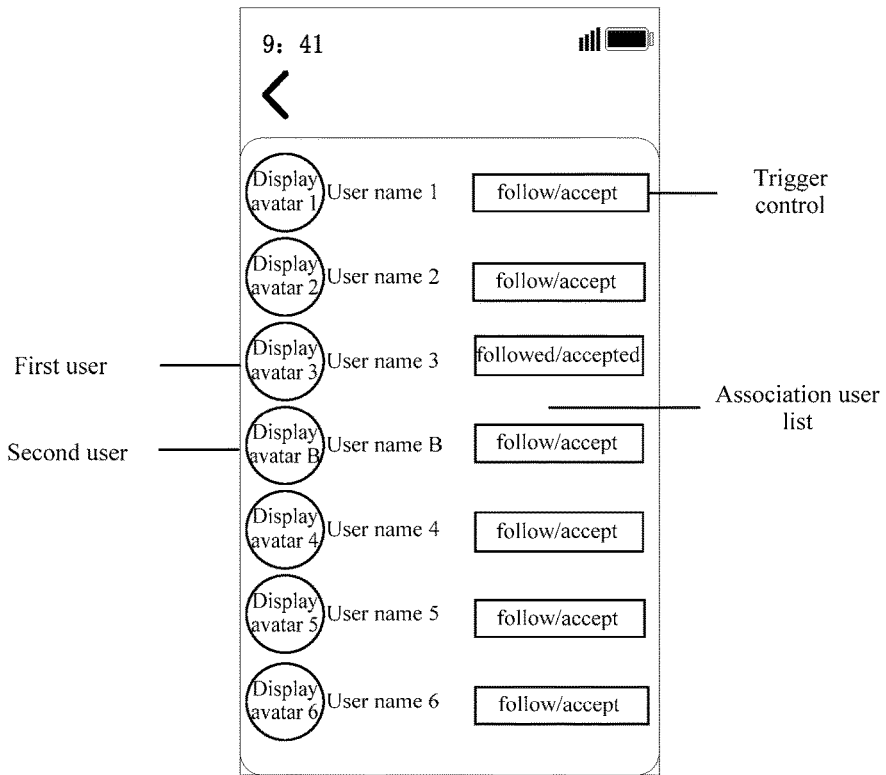
FIG. 10 is a schematic diagram of an interface on which a second user is presented in an association user list according to an embodiment of the present disclosure.

In this embodiment, the current user triggers a certain first user in the association user list, if the control corresponding to the first user 3 shown in FIG. 1 is triggered, the first user 3 is located at a position of the third row in the current presentation page of the association user list, and the presentation position of the second user determined by the first user may be located at a position of the first row in the entire association user list, referring to FIG. 9. In FIG. 9, the second user B is the second user determined according to the first user. The preset presentation position is a display position next to the display position of the first user in the association user list, referring to FIG. 10. In FIG. 10, the second user B is the second user determined according to the first user. In addition, the number of preset presentation positions corresponds to the number of second users, for example, the number of second users is 3, so the preset presentation positions are also 3.

In S220, the at least one second user is updated and immediately displayed in the association user list based on a preset update animation and the presentation position.

In this embodiment, the preset update animation is a preset display animation for updating the association user list, and the preset update animation may include a fade-in animation, a fly-in animation, a refresh page animation, and the like. This process of updating the second user determined according to the first user into the association user list is visual, and the second user may be inserted into the association user list through the preset update animation. When the first user in the association user list is triggered, and the second user has been determined according to the first user, the determined second user is inserted into the association user list, for example, 3 second users are determined, these 3 second users may be presented in the sight of the current user in a manner of flying into the playing animation, respectively; alternatively, the 3 second users may be presented in the sight of the current user through an application auto-refresh interface. The benefits of this arrangement are in that the current user can visually observe which recommended users are newly promoted, the vision of the target user is impacted through the animation effect, and the prompt effect on the current user is enhanced.

Since the position where the first user is located may be any display position in the association user list, for example, the position where the first user is located may be the position of the first row in the association user list, or the position of the second row in the association user list, or the position of other rows in the association user list. When the follow control is triggered, the display position of the first user in the association user list is updated while the first display information is updated to the second display information. In an embodiment, the first user is displayed at the top position of the association user list. That is, when the follow control is triggered, the first user at any display position on the current display page of recommendation users is set to the top as the first display position on the current display page. The benefits of this arrangement include that after the current user has followed the first user, the position of the first user in the display list is set to the top, and the display position of the first user is more conspicuous for the current user.

According to the technical schemes of the embodiments of the present disclosure, when it is detected that the current user triggers the follow control corresponding to the first user, a second user commonly associated with the first user and the current user is determined, and at least one second user is displayed in the association user list to which the first user belongs, so that the relatively large calculation amount, the relatively high calculation cost and the relatively poor real-time performance because the user associated with the current user needs to be determined from mass data in the related art can be avoided, and thus the technical effect of improving the real-time performance in determining the second user on the basis of reducing the calculation amount is achieved.

Figure 11:
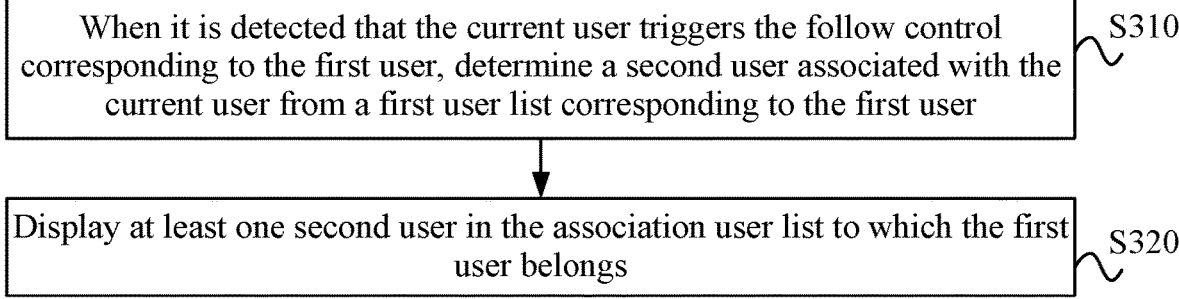
FIG. 11 is a schematic flowchart of an information processing method according to an embodiment of the present disclosure.

FIG. 11 is a schematic flowchart of an information processing method according to an embodiment of the present disclosure, on the basis of the foregoing embodiments, how to determine the second user according to the first user after the current user triggers the follow control to follow the first user is described in detail, and embodiments thereof may be made to the technical scheme of this embodiment. Technical terms identical or corresponding to those of the above-described embodiments are not repeated here.

As shown in FIG. 11, the method includes the steps described below.

In S310, when it is detected that the current user triggers the follow control corresponding to the first user, a second user associated with the current user is determined from a first user list corresponding to the first user.

The first user list includes a following user list and a followed user list. The following user list refers to some other users followed by the first user, and the followed user list refers to some other user following the first user, in other words, a fan list of the first user.

In this embodiment, the manner in which the second user associated with the current user is determined from the first user list corresponding to the first user may include a variety of manners, and how to determine the second user is described as follows.

Manner one: the second user is determined from the association user list corresponding to the first user by a preset common number threshold, which mainly includes the steps described below: to-be-selected users in the first user list corresponding to the first user are acquired; for each to-be-selected user, the number of target common users between the current to-be-selected user and the current user is determined; and the second user is determined from the to-be-selected users according to the number of target common users and a preset common number threshold.

The to-be-selected users may be some other users followed by the first user, fan users of the first user, and friends of the first user. The number of target common users is the number of the same users owned by the current user and the to-be-selected user. The preset common number threshold is a preset number value, assuming that the preset common number threshold is 3, for each to-be-selected user, the number of target common users between each to-be-selected user and the current user is determined, it is further determined whether the number of target common users is greater than or equal to 3, if the number of target common users is greater than or equal to 3, the to-be-selected user may be retained as the second user, and if the number of target common users is less than 3, it represents that the number of target common users between the to-be-selected user and the current user is less than 3, the to-be-selected user may be discarded to be excluded from the range of the second user.

In an actual application, when the current user triggers the follow control, the first user of the current user may be determined at this time, some other users followed by the first user, fan users of the first user, and friends of the first user are further acquired, all above users related to the first user are used as to-be-selected users, and these to-be-selected users are used as a candidate pool of the second user. Then the number of users commonly owned by each to-be-selected user and the current user is calculated respectively, if the number of the same users owed by a to-be-selected user and the current user is greater than or equal to the preset common number threshold, the current to-be-selected user is used as the second user, and if the number of the same users owned by the current to-be-selected user and the current user is less than the preset common number threshold, the current to-be-selected user is not used as the second user.

Exemplarily, when the current user A triggers the follow control corresponding to the first user 3, all users associated with the first user 3 are 100 to-be-selected users in total, and then the number of the same users owned by each to-be-selected user and the current user is calculated respectively. If to-be-selected users have the number of the same users owned by each to-be-selected user and the current user A larger than or equal to the preset common number threshold of 3 are determined as to-be-selected user C, to-be-selected user D and to-be-selected user E, the to-be-selected user C, the to-be-selected user D and the to-be-selected user E are used as the second users.

It should be noted that the advantage of determining the presented users based on the above manner includes that from the mass data, a candidate user pool corresponding to the current user is decreased, and the time-sensitivity of determining the second user associated with the current user is improved.

On the basis of the foregoing embodiments, the preset common number threshold is a value that may be set in advance, when the set value of the preset common number threshold is relatively small, the situation where an effective number of second users cannot be determined due to a too-large number of second users may occur, so that the preset common number threshold should be set to a value that may be adjusted according to actual situations.

Based on this, the second user may be determined by adjusting the preset common number threshold, and in an embodiment, when the number of to-be-presented users reaches the preset number threshold, the preset common number threshold is adjusted to determine the second user based on the adjusted preset common number threshold.

When the number of second users determined according to the preset common number threshold is larger than this preset value, it is necessary to adjust the preset common number threshold adaptively. Exemplarily, when the number of to-be-selected users reaches the preset common number threshold, the preset common number threshold may be adjusted, for example, incrementing by 1 each time, i.e., the preset common number threshold is adjusted from original 1 to 2, and at this time, if the number of to-be-selected users still reaches the preset number threshold, the preset common number threshold is adjusted to 3, and at this time, if the number of to-be-selected users still reaches the preset number threshold, the preset common number threshold is adjusted to 4 until the current number of to-be-selected users determined based on the adjusted preset common number threshold is within the range of the preset number threshold, after the preset common number threshold is adjusted. The benefits of this arrangement include that a limited number of second users may be determined, and the corresponding second users may be presented without affecting the user to trigger and follow the original first user, whereby the light popularization rate of the second user is achieved.

Manner two: the second user is determined according to a similarity or the number of common users between each to-be-selected user in the predetermined first user list and the current user.

The first user list includes all to-be-selected users. The similarity characterizes an association degree between each to-be-selected user and the current user, and the number of common users refers to the number of users co-followed by the current user and each to-be-selected user. The similarity or the number of common users may be used as evaluation attributes for determining whether a to-be-selected user may be used as the second user, a certain condition may be set in advance with respect to both evaluation attributes, respectively, and when the similarity or the number of common users satisfies the corresponding condition, the to-be-selected user may be determined as the second user.

In an actual application, the similarity between each to-be-selected user in the association user list and the current user may be determined by similarities of feature 1, feature 2, and feature 3 of the user, and the value of the similarity may be determined by calculating a Pearson correlation coefficient, a cosine similarity, or a modified cosine similarity of such information between the current user and the to-be-selected user. Meanwhile, the similarity between users may also be used in combination with the number of common users to determine the second user. The benefits of this arrangement are that the similarity between users can be quantified so that the degree of the similarity between users can be distinguished, and thus the second user can be determined from multiple aspects.

It should be noted that manner one and manner two of determining the second user are two parallel manners, and there is no sequential order in the implementation process.

In S320, the at least one second user is displayed in the association user list to which the first user belongs.

According to the technical schemes of the embodiments of the present disclosure, the second user associated with the current user may be determined based on the association user list corresponding to the first user, so that the second user associated with the current user can be effectively determined under the condition of reducing the user pool, and the technical effect of determining the second user in real time is achieved.

FIG. 12 is a schematic flowchart of an information processing method according to an embodiment of the present disclosure, on the basis of the foregoing embodiments, when there are multiple second users, a presentation order of the multiple second users in the association user list may be determined according to the association attribute of the users, and embodiments thereof may be made to the technical scheme of this embodiment. Technical terms identical or corresponding to those of the above-described embodiments are not repeated here.

As shown in FIG. 12, the method includes described below.

In S410, in response to a trigger instruction for a first user in an association user list, at least one second user is determined according to the first user.

In S420, a presentation order of the at least one second user in the preset presentation position is determined based on an association attribute of each second user and the current user.

In this embodiment, when the number of second users determined according to the similarity or the number of common users is greater than 1, association attributes between different second users and the current user are different, and the presentation of the users in the association user list is sequential, at this time, the presentation order of the multiple second users needs to be determined. In an actual application, the association degrees between different second users and the current user are different, the association between each second user and the current user may be ranked quantitatively, and the presentation order of the second users in the preset presentation position may be determined according to the magnitude of the value of the association attribute.

In an embodiment, for each second user, user feature data of the current user and user feature data of the current second user are processed based on a pre-trained prediction model to obtain the association attribute between each second user and the current user; and the presentation order of the second users is determined based on the association attribute of each second user.

The prediction model is pre-trained, and the similarity between two users may be quantified through the prediction model. The association attribute is the similarity between each to-be-selected user in the association user list and the current user and may be determined according to the similarities of feature data 1, feature data 2, and feature data 3 of the users, where feature data 1, feature data 2, feature data 3 may each used as one association attribute, a quantized value of each association attribute may be determined by calculating the Pearson correlation coefficient, the cosine similarity, or the modified cosine similarity between the association attribute of the current user and the association attribute of each to-be-selected user. The benefits of this arrangement include that the presentation order of the second users in the association user list is determined according to the overall association degree between each second user and the current user, and the second users are displayed according to the presentation order, thus the conversion rate of the second user is improved.

In an actual application, for each second user, a similarity calculation is performed on feature data, such as feature data 1, feature data 2, and feature data 3, between the current user and the current second user based on the prediction model obtained by pre-training in advance. Each association attribute may be subjected to a similarity quantization calculation, and a weight value is assigned to the similarity of each association attribute. Finally, an overall ranking of the feature data between the current user and the current second user is obtained by summing a product of the similarity of each association attribute and the corresponding weight value, and the presentation order of second users is determined based on the ranking. That is, a second user with a high overall similarity of the feature data between the current user and the current second user is arranged in an upper position, and all second users are sequentially arranged according to the ranking of the similarity.

Exemplarily, the second user associated with current user A includes user C, user D, and user E, the feature data between the current user A and the second user includes feature data 1, feature data 2, and feature data 3, and each feature data is divided into multiple dimensions. Assuming that, based on the feature data, a similarity between the current user A and the second user C is determined to be 0.5, a similarity between the current user A and the second user D is determined to be 0.6, and a similarity between the current user A and the second user E is determined to be 0.7. The above similarities are ranked sequentially based on the magnitude of the similarity, and the presentation order of second users in the to-be-presented list is as follows: the first presentation position is the user E, the second presentation position is the user D, and the third presentation location is the user C.

In an embodiment, if the user number of the second users reaches a target number threshold, a second user corresponding to the target number threshold is determined from the at least one second user according to the association attribute.

In an actual application, if the preset common number threshold between the current user and the second user is 5, 10 users may be screened out as the second users, and the target number threshold is set to 3, that is, only 3 users in the 10 users may be displayed as the second users in the association user list. At this time, the users may be sequentially ranked according to the similarity of the association attribute, and according to the sequential ranking of the values of the similarity, users with the top three values of the similarity of the association attributes between the current user and the second users are selected as the second users. The benefits of this arrangement include the following: the second users are determined in the similarity quantization manner so that the association between the determined second users and the current user is relatively high, whereby the technical effect of improving the conversion rate of the determined second user is improved.

According to the technical schemes of the embodiments of the present disclosure, when it is detected that the current user triggers the follow control corresponding to the first user, the at least one second user is determined, and the second user associated with the current user is determined from the association user list corresponding to the first user. The presentation order of the at least one second user in the association user list is further determined to present the at least one second user in the association user list based on the presentation order. Subsequently, the display position of the first user in the association user list is acquired, and the at least one second user is inserted at a display position next to the display position of the first user and the inserted at least one second user is displayed, so that not only the second user is determined, but also the presentation order of the second user in the display interface is adjusted according to the association degree between the second user and the current user, whereby the technical effect of improving the conversion rate of the determined second user is improved.

FIG. 13 is a schematic flowchart of an information processing method according to an embodiment of the present disclosure, on the basis of the foregoing embodiments, when the second user is determined and the association user list is updated, and all first users originally located in the association user list are updated simultaneously. Embodiments thereof may be made to the technical scheme of this embodiment, and technical terms identical or corresponding to those of the above-described embodiments are not repeated here.

As shown in FIG. 13, the method includes the steps described below.

In S510, in response to a trigger instruction for a first user in an association user list, the association user list is dynamically updated and the updated association user list is displayed.

In S520, a presentation order of all first users in the association user list is updated in the association user list.

In this embodiment, when the current user triggers the first user in the association user list, and at this time, the followed users of the current user are updated, and affinities between the first users in the association user list and the current user may change, so a display order of the first users in the association user list may be updated according to the relationship of changed affinities.

In an embodiment, when the current user triggers the follow control of a certain first user, there is one possibility that the current user has followed the first user, however, the second user is not generated, and since the current user follows the certain first user, the real-time information may change an association attribute between the current user and all other users, including other non-followed users originally located in the association user list. Since the association attribute between the current user and other non-followed users is changed, the magnitude of the changed association attribute may be used as the presentation order of all first users in the association user list, in order to improve the conversion rate of the users. The benefits of this arrangement are as follows: the real-time data can be effectively utilized to determine the presentation order of the first users in the association user list, whereby the attention degree of the current user for the first users is improved.

According to the technical schemes of the embodiment of the present disclosure, in response to the trigger instruction for the first user in the association user list, the association user list is dynamically updated and displayed, and the presentation order of all first users in the association user list is updated in the association user list. In this manner, the real-time data can be effectively utilized to determine the presentation order of the first users in the association user list, thus the attention degree of the current user for the first users is improved.

FIG. 14 is a schematic structural diagram of an information processing apparatus according to an embodiment of the present disclosure, as shown in FIG. 14, the apparatus includes an association list update module 610.

The association list update module 610 is configured to, in response to a trigger instruction from a current user for a first user in an association user list, dynamically update the association user list and display the updated association user list.

On the basis of the above technical schemes, the association list update module 610 includes a second user position determination sub-module and a second user display sub-module.

The second user position determination sub-module is configured to determine a presentation position of the at least one second user in the association user list.

The second user position determination sub-module includes a presentation position preset unit configured to determine a preset presentation position.

The presentation position preset unit includes a top position determination sub-unit and a next display position determination sub-unit.

The top position determination sub-unit is configured to set the preset presentation position to the top presentation position in the association user list.

The next display position determination sub-unit is configured to set the preset presentation position to a display position next to a display position of the first user in the association user list.

The second user display sub-module is configured to update and immediately display the at least one second user in the association user list based on a preset update animation and the presentation position.

The second user position determination sub-module further includes a presentation order determination sub-module, and the presentation order determination sub-module is configured to determine a presentation order of the second users in the preset presentation position based on an association attribute of each second user and the current user.

On the basis of the above technical schemes, the association list update module 610 includes a display information update sub-module.

The display information update sub-module is configured to update a follow control corresponding to the first user from first display information to second display information and update a display position of the first user in the association user list.

On the basis of the above technical schemes, the display information update sub-module further includes a top position display unit and a first user removing unit.

The top position display unit is configured to display the first user at the top position of the association user list.

The first user removing unit is configured to remove the first user from the association user list.

On the basis of the above technical schemes, the association list update module 610 includes a second user determination sub-module. The second user determination sub-module is configured to determine, from a first user list corresponding to the first user, a second user associated with the current user.

On the basis of the above technical schemes, the second user determination sub-module further includes a to-be-selected user acquisition unit, a common user determination unit, and a second user determination unit.

The to-be-selected user acquisition unit is configured to acquire to-be-selected users in the first user list corresponding to the first user.

The common user determination unit is configured to, for each to-be-selected user, determine the number of target common users between the current to-be-selected user and the current user.

The second user determination unit is configured to determine, according to the number of target common users and a preset common number threshold, the second user associated with the current user from the to-be-selected users.

On the basis of the above technical schemes, the second user determination unit further includes a number threshold adjustment unit. The number threshold adjustment unit is configured to, when the number of second users reaches a preset number threshold, adjust the preset common number threshold to determine the second user associated with the current user based on the adjusted preset common number threshold.

On the basis of the above technical schemes, the second user determination unit is configured to determine the second user associated with the current user according to a predetermined similarity or a number of common users between each to-be-selected user in the association user list and the current user.

On the basis of the above technical schemes, the presentation order determination sub-module further includes an association attribute determination unit and a presentation order determination unit.

The association attribute determination unit is configured to, for each second user, process user feature data of the current user and user feature data of the current second user based on a pre-trained prediction model to obtain the association attribute between each second user and the current user.

The presentation order determination unit is configured to determine the presentation order of the at least one second user based on the association attribute of each second user.

On the basis of the above technical schemes, the second user determination unit is configured to, in response to the user number of second users reaching a target number threshold, determine a second user corresponding to the target number threshold from the at least one second user according to the association attribute.

On the basis of the above technical schemes, the association list update module 610 includes a first user update sub-module. The first user update sub-module is configured to update, in the association user list, the presentation order of all first users in the association user list.

On the basis of the above technical schemes, the association list update module 610 includes an association user list determination sub-module. The association user list determination sub-module is configured to determine the association user list corresponding to the current user based on a server recommendation model and the current user attribute of the current user.

According to the technical schemes of the embodiments of the present disclosure, when it is detected that the current user triggers the follow control corresponding to the first user, a second user associated with both the first user and the current user is determined, and at least one second user is displayed in an association user list to which the first user belongs, so that the relatively large calculation amount, the relatively high calculation cost and the relatively poor real-time performance because the user associated with the current user needs to be determined from mass data in the related art are avoided, and thus the technical effect of improving the real-time performance in determining the second user on the basis of reducing the calculation amount is achieved.

The information processing apparatus provided in the embodiments of the present disclosure may execute the information processing method provided in any of the embodiments of the present disclosure, and possess the corresponding functional modules and beneficial effects for performing the method.

It should be noted that the multiple units and modules included in the above-described apparatus are only divided according to the functional logic and are not limited to the above-described division, as long as the corresponding functions may be implemented; in addition, names of the respective functional units are merely used to facilitate distinguishing from each other and are not intended to limit the scope of protection of the embodiments of the present disclosure.

Figure 15:
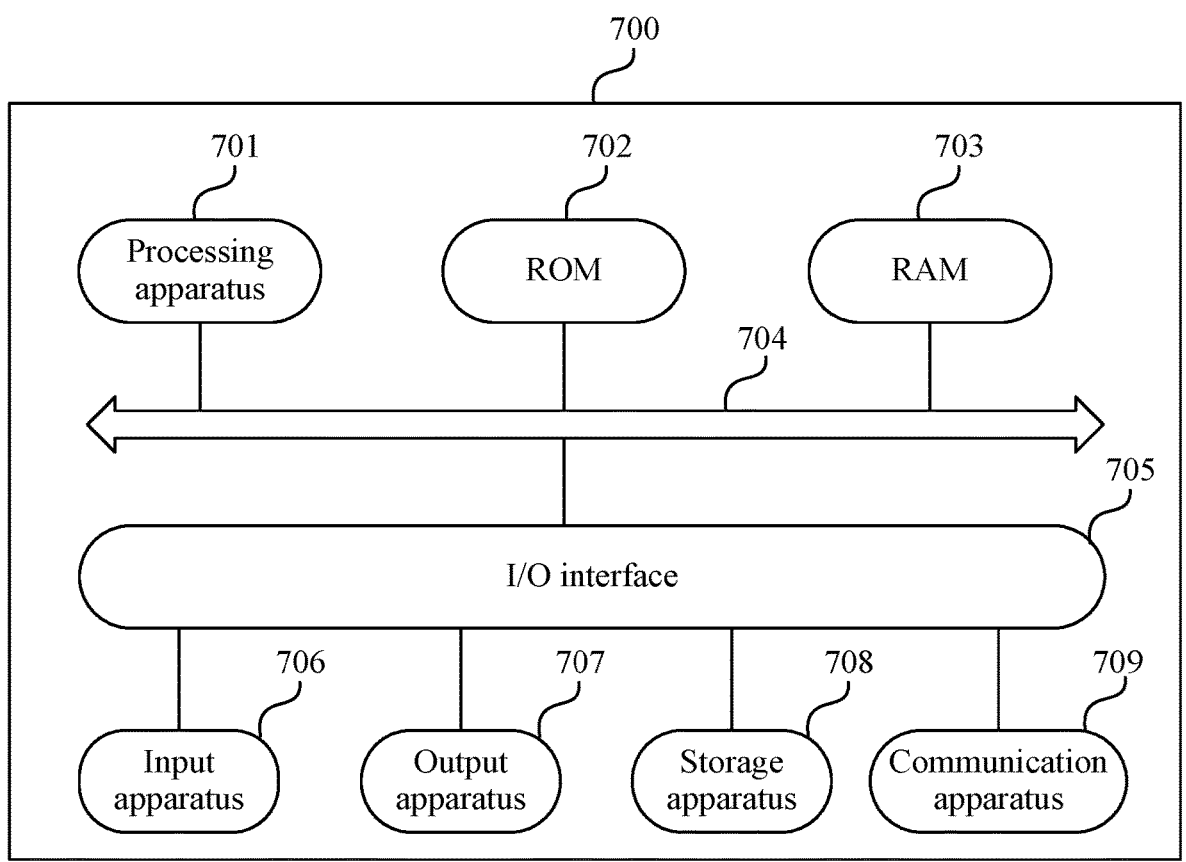
FIG. 15 is a schematic structural diagram of an electronic device according to an embodiment of the present disclosure.

FIG. 15 is a schematic structural diagram of an electronic device according to an embodiment of the present disclosure. Referring to FIG. 15, FIG. 15 shows a structural schematic diagram of the electronic device 700 (such as a terminal device or a server in FIG. 15) suitable for implementing the embodiments of the present disclosure. The terminal device in the embodiments of the present disclosure may include, but is not limited to, a mobile terminal such as a mobile phone, a laptop computer, a digital broadcast receiver, a personal digital assistant (PDA), a tablet computer (PAD), a portable multimedia player (PMP), an in-vehicle terminal (such as, an in-vehicle navigation terminal), and a fixed terminal such as a digital television (TV), and a desktop computer. The electronic device shown in FIG. 15 is merely an example and should not pose any limitation on the scope of use and function of the embodiments of the present disclosure.

As shown in FIG. 15, the electronic device 700 may include a processing apparatus 701 (such as, a central processing unit, and a graphics processor), the processing apparatus may perform various appropriate actions and processing according to a program stored in a read-only memory (ROM) 702 or a program loaded from a storage apparatus 708 into a random access memory (RAM) 703. Various programs and data required for the operations of the electronic device 700 are also stored in the RAM 703. The processing unit 701, the ROM 702 and the RAM 703 are connected to one another via a bus 704. An input/output (I/O) interface 705 is also connected to the bus 704.

In general, the following apparatuses may be connected to the I/O interface 705: an input apparatus 706 such as a touch screen, a touchpad, a keyboard, a mouse, a camera, a microphone, an accelerometer, and a gyroscope; an output apparatus 707 such as a liquid crystal display (LCD), a speaker, and a vibrator; the storage apparatus 708 such as a magnetic tape, and a hard disk; and a communication apparatus 709. The communication apparatus 709 may allow the electronic device 700 to communicate with other devices in a wireless or wired manner to exchange data. Although FIG. 15 shows the electronic device 700 having various apparatuses, it should be understood that it is not required to implement or include all the shown apparatuses. More or fewer apparatuses may alternatively be implemented or included.

In particular, according to the embodiments of the present disclosure, the process described above with reference to the flowcharts may be implemented as a computer software program. For example, the embodiments of the present disclosure include a computer program product including a computer program carried on a non-transitory computer-readable medium, and the computer program includes a program code for performing the method shown in the flowcharts. In such an embodiment, the computer program may be downloaded and installed from the network through the communication apparatus 709, or may be installed from the storage apparatus 708, or may be installed from the ROM 702. When the computer program is executed by the processing apparatus 701, the above-described functions defined in the method of the embodiments of the present disclosure are executed.

The names of messages or information exchanged between the multiple apparatuses in the embodiments of the present disclosure are for illustrative purposes only, and not for limiting the scope of these messages or information.

The electronic device provided in the embodiments of the present disclosure belongs to the same inventive concept as the information processing method provided in the above-described embodiments, the technical details, which are not elaborated in this embodiment, may be referred to the above-described embodiments, and this embodiment has the same beneficial effects as the above-described embodiments.

An embodiment of the present disclosure provides a computer storage medium. A computer program is stored on the computer storage medium. The program, when executed by a processor, implements the information processing method provided in the above-described embodiments.

It should be noted that the above-described computer-readable medium of the present disclosure may be a computer-readable signal medium, or a computer-readable storage medium, or any combination of the computer-readable signal medium and the computer-readable storage medium. The computer-readable storage medium may be, for example, but not limited to, an electronic, magnetic, optical, electromagnetic, infrared, or semiconductor system, apparatus, or device, or any combination thereof. More examples of the computer-readable storage media may include, but are not limited to, electrical connections with one or more wires, a portable computer magnetic disk, a hard disk, a random access memory (RAM), a read-only memory (ROM), an erasable programmable read-only memory (EPROM or a flash), an optical fiber, a portable and compact disc read-only memory (CD-ROM), an optical storage device, a magnetic storage device, or any suitable combination thereof. In the present disclosure, the computer-readable storage medium may be any tangible medium that contains or stores a program, the program may be used by or in combination with an instruction execution system, apparatus, or device. In the present disclosure, the computer-readable signal medium may include a data signal that is contained in a baseband or propagated as a part of a carrier wave, and the data signal carries a computer-readable program code. Such a propagated data signal may take many forms, including but not limited to an electromagnetic signal, an optical signal, or any suitable combination thereof. The computer-readable signal medium may also be any computer-readable medium other than the computer-readable storage medium, and the computer-readable signal medium may send, propagate, or transmit a program for being used by or in combination with the instruction execution system, apparatus, or device. The program code contained in the computer-readable medium may be transmitted by using any appropriate medium, including but not limited to an electric wire, an optical cable, a radio frequency (RF), etc., or any suitable combination thereof.

In some embodiments, the client side and the server may communicate by using any currently known or future developed network protocol, such as a hyper text transfer protocol (HTTP), and may interconnect with any form or medium of digital data communication (such as a communication network). An example of the communication network includes a local area network ("LAN"), a wide area network ("WAN"), an Internet network (such as the Internet), an end-to-end network (such as an ad hoc end-to-end network), and any network currently known or developed in the future.

The computer-readable medium described above may be included in the electronic device described above; and the computer-readable medium described above may also exist separately and is not fitted into the electronic device.

The computer-readable medium carries one or more programs, the one or more programs, when executed by the electronic device, cause the electronic device to implement the following: in response to a trigger instruction from a current user for a first user in an association user list, dynamically updating the association user list and displaying the updated association user list, where the association user list corresponds to the current user, and the electronic device is caused to implement dynamically updating the association user list in the manner of determining at least one second user according to the first user, and updating the association user list based on the at least one second user.

Computer program codes for performing the operations of the present application may be written in one or more programming languages or combinations thereof, the described programming languages include, but are not limited to, an object-oriented programming language—such as Java, Smalltalk, C++, and further include a conventional procedural programming language—such as a "C" language or similar programming language. The program code may be executed in the following manners: executed entirely on a user's computer, executed partly on the user's computer, executed as an independent software package, executed partly on the user's computer and partly on a remote computer, or executed entirely on the remote computer or a server. In a case where the remote computer is involved, the remote computer may be connected to the user's computer through any kind of network, including a local area network (LAN) or a wide area network (WAN), or may be connected to an external computer (for example, connected to the external computer through an internet provided by an Internet service provider).

The flowchart and block diagram in the drawings illustrate the architecture, functionality, and operation of possible implementations of the system, the method and the computer program product according to various embodiments of the present disclosure. In this regard, each block in the flowchart or block diagram may represent a module, a program segment, or a part of codes, which includes one or more executable instructions for implementing a specified logical function. It should also be noted that, in some alternative implementations, the functions noted in the blocks may occur out of the order noted in the drawings. For example, two blocks shown in succession may, in fact, be executed substantially concurrently, or the two blocks may sometimes be executed in a reverse order, which depends upon the involved functionality. It should also be noted that each block of the block diagram and/or the flowchart, and combinations of blocks of the block diagram and/or the flowchart, may be implemented by a dedicated hardware-based system that performs a specified function or operation, or by a combination of dedicated hardware and a computer instruction.

The units described in the embodiments of the present disclosure may be implemented by software or hardware. The name of the unit does not constitute a limitation on the unit itself in some cases.

The functions described above herein may be performed at least in part by one or more hardware logic components. For example, without limitation, exemplary types of hardware logic components that may be used include a field programmable gate array (FPGA), an application specific integrated circuit (ASIC), a special purpose standard product (ASSP), a system on chip (SOC), a complex programmable logic device (CPLD), and the like.

In the context of the present disclosure, a machine-readable medium may be a tangible medium that may contain or store a program available for an instruction execution system, apparatus or device or a program used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any appropriate combination of the foregoing. More examples of the machine-readable storage medium may include an electrical connection based on one or more wires, a portable computer diskette, a hard disk, a random access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination of the foregoing.

According to one or more embodiments of the present disclosure, [example one] provides an information processing method, and the method includes the following: in response to a trigger instruction from a current user for a first user in an association user list, the association user list is dynamically updated and the updated association user list is displayed; where the association user list corresponds to the current user, and the step in which the association user list is dynamically updated includes at least one second user is determined according to the first user, and the association user list is updated based on the at least one second user; where the at least one second user is associated with the first user.

According to one or more embodiments of the present disclosure, [example two] provides an information processing method, and the method further includes the following: a presentation position of the at least one second user in the association user list is determined; and the at least one second user is updated and immediately displayed in the association user list based on a preset update animation and the presentation position.

According to one or more embodiments of the present disclosure, [example three] provides an information processing method, and the method includes the following: a follow control corresponding to the first user is updated from first display information to second display information; and a display position of the first user in the association user list is updated.

According to one or more embodiments of the present disclosure, [example four] provides an information processing method, and the method further includes the following: the first user is displayed at the top position of the association user list; or the first user is removed from the association user list.

According to one or more embodiments of the present disclosure, [example five] provides an information processing method, and the method further includes that the presentation position is a preset presentation position in the association user list.

According to one or more embodiments of the present disclosure, [example six] provides an information processing method, and the method further includes the following: the preset presentation position is a display position next to a display position of the first user in the association user list; where the position number of the preset presentation position corresponds to the number of the at least one second user.

According to one or more embodiments of the present disclosure, [example seven] provides an information processing method, and the method further includes that a presentation order of second users in the preset presentation position is determined based on an association attribute of the multiple second users and the current user.

According to one or more embodiments of the present disclosure, [example eight] provides an information processing method, and the method further includes that a second user associated with the current user is determined from a first user list corresponding to the first user.

According to one or more embodiments of the present disclosure, [example nine] provides an information processing method, and the method further includes the following: to-be-selected users in the first user list corresponding to the first user are acquired; for each to-be-selected user, the number of target common users between the current to-be-selected user and the current user is determined; and the second user associated with the current user is determined from the to-be-selected users according to the number of target common users and a preset common number threshold.

According to one or more embodiments of the present disclosure, [example ten] provides an information processing method, and the method further includes that, when the number of second users reaches a preset number threshold, the preset common number threshold is adjusted to determine the second user associated with the current user based on the adjusted preset common number threshold.

According to one or more embodiments of the present disclosure, [example eleven] provides an information processing method, and the method further includes that the second user associated with the current user is determined according to a predetermined similarity between each to-be-selected user in the first user list and the current user.

According to one or more embodiments of the present disclosure, [example twelve] provides an information processing method, and the method further includes the following: for each second user, user feature data of the current user and user feature data of the current second user are processed based on a pre-trained prediction model to obtain the association attribute between each second user and the current user; and the presentation order of the at least one second user is determined based on the association attribute of each second user.

According to one or more embodiments of the present disclosure, [example thirteen] provides an information processing method, and the method further includes that, if the user number of second users reaches a target number threshold, a second user corresponding to the target number threshold is determined from the at least one second user according to the association attribute.

According to one or more embodiments of the present disclosure, [example fourteen] provides an information processing method, and the method further includes that a presentation order of all first users in the association user list is updated in the association user list.

According to one or more embodiments of the present disclosure, [example fifteen] provides an information processing method, and the method further includes that the association user list corresponding to the current user is determined based on a server recommendation model and a current user attribute of the current user.

According to one or more embodiments of the present disclosure, [example sixteen] provides an information processing apparatus, the apparatus includes an association list update module, the association list update module is configured to, in response to a trigger instruction from a current user for a first user in an association user list, dynamically update the association user list and display the updated association user list, where the association user list corresponds to the current user, and the association list update module is configured to dynamically update the association user list in the manner of determining at least one second user according to the first user and updating the association user list based on the at least one second user.

The foregoing description is illustrative of the alternative embodiments of the present disclosure and the principles of the technology employed. It should be understood by those skilled in the art that the scope of the present disclosure is not limited to the technical schemes in which the technical features described above are formed in combinations, but also covers other technical schemes formed by any combination of the above-described technical features or their equivalent features without departing from the above-disclosed concept, such as a technical scheme that is formed by interchanging the above-described features with the technical features disclosed in the present disclosure (but not limited to) having similar functions.

Furthermore, while each operation is depicted in a particular order, this should not be construed as requiring these operations to be performed in the particular order shown or in a sequential order. Under certain circumstances, multitasking and parallel processing may be advantageous. Likewise, although several specific implementation details are included in the above discussion, these should not be construed as limiting the scope of the present disclosure. Certain features described in the context of separate embodiments may also be implemented in combination in a single embodiment. Conversely, various features described in the context of the single embodiment may also be implemented in multiple embodiments separately or in any suitable sub-combination.

Although the subject matter has been described in language of structural features and/or methodological actions, it should be understood that the subject matter defined in the appended claims is not necessarily limited to the features or actions described above. Rather, the features and actions described above are merely exemplary forms of implementing the claims.

What is claimed is:

1. An information processing method, comprising:

in response to a trigger instruction from a current user for a follow control corresponding to a first user in an association user list presented on a page so as to follow the first user, dynamically updating the association user list and displaying the updated association user list; wherein the association user list corresponds to the current user, and dynamically updating the association user list comprises: determining at least one second user according to the first user, and updating the association user list based on the at least one second user; wherein the at least one second user is associated with the first user, and wherein dynamically updating the association user list and displaying the updated association user list comprise:

updating and immediately displaying the at least one second user in the association user list based on a preset update animation and a preset presentation position of the at least one second user in the association user list.

2. The method of claim 1, further comprising:

determining the presentation position of the at least one second user in the association user list.

3. The method of claim 1, wherein dynamically updating the association user list and displaying the updated association user list comprise:

updating the follow control corresponding to the first user from first display information to second display information; and updating a display position of the first user in the association user list.

4. The method of claim 3, wherein updating the display position of the first user in the association user list comprises:

displaying the first user at a top position of the association user list; or removing the first user from the association user list.

5. The method of claim 1, wherein the preset presentation position is a top presentation position in the association user list; or the preset presentation position is a display position next to a display position of the first user in the association user list;

wherein a position number of the preset presentation position corresponds to a number of the at least one second user.

6. The method of claim 5, wherein the at least one second user comprises a plurality of second users, and the method further comprises:

determining, based on an association attribute of each of the plurality of second users and the current user, a presentation order of the plurality of second users in the preset presentation position.

7. The method of claim 1, wherein determining the at least one second user according to the first user comprises:

determining, from a first user list corresponding to the first user, a second user associated with the current user;

wherein the first user list comprises a following user list and a followed user list.

8. The method of claim 7, wherein determining, from the first user list corresponding to the first user, the second user associated with the current user comprises:

acquiring to-be-selected users in the first user list corresponding to the first user;

for each of the to-be-selected users, determining a number of target common users between a current to-be-selected user and the current user; and determining, according to the number of target common users and a preset common number threshold, the second user from the to-be-selected users.

9. The method of claim 8, further comprising:

in response to a number of the at least one second user reaching a preset number threshold, adjusting the preset common number threshold to determine the second user based on the adjusted preset common number threshold.

10. The method of claim 8, wherein determining, from the first user list corresponding to the first user, the second user associated with the current user comprises:

determining, according to a predetermined similarity between each of the to-be-selected users in the first user list and the current user, the second user associated with the current user.

11. The method of claim 6, wherein determining, based on the association attribute of each of the plurality of second users and the current user, the presentation order of the plurality of second users in the preset presentation position comprises:

processing, for each of the plurality of second users, user feature data of the current user and user feature data of a current second user based on a pre-trained prediction model to obtain the association attribute between each of the plurality of second users and the current user; and determining the presentation order of the plurality of second users based on the association attribute of each of the plurality of second users.

12. The method of claim 11, further comprising:

in response to a user number of the plurality of second users reaching a target number threshold, determining, from the plurality of second users, a second user corresponding to the target number threshold according to the association attribute.

13. The method of claim 1, wherein updating the association user list comprises:

updating, in the association user list, a presentation order of all first users in the association user list.

14. The method of claim 1, wherein before in response to the trigger instruction for the first user in the association user list, dynamically updating the association user list and displaying the updated association user list, the method further comprises:

determining the association user list corresponding to the current user based on a server recommendation model and a current user attribute of the current user.

15. An electronic device, comprising:

at least one processor;

a storage apparatus, which is configured to store at least one program;

wherein the at least one program, when executed by the at least one processor, causes the at least one processor to implement the following:

in response to a trigger instruction from a current user for a follow control corresponding to a first user in an association user list, dynamically updating the association user list and displaying the updated association user list presented on a page so as to follow the first user; wherein the association user list corresponds to the current user, and dynamically updating the association user list comprises: determining at least one second user according to the first user, and updating the association user list based on the at least one second user; wherein the at least one second user is associated with the first user, and wherein dynamically updating the association user list and displaying the updated association user list comprise:

updating and immediately displaying the at least one second user in the association user list based on a preset update animation and a preset presentation position of the at least one second user in the association user list.

16. The electronic device of claim 15, wherein the at least one processor is caused to further implement the following:

determining the presentation position of the at least one second user in the association user list.

17. The electronic device of claim 15, wherein the at least one processor is caused to implement dynamically updating the association user list and displaying the updated association user list by:

updating the follow control corresponding to the first user from first display information to second display information; and updating a display position of the first user in the association user list.

18. The electronic device of claim 17, wherein the at least one processor is caused to implement updating the display position of the first user in the association user list by:

displaying the first user at a top position of the association user list; or removing the first user from the association user list.

19. A non-transitory storage medium comprising a computer-executable instruction, wherein the computer-executable instruction is configured to, when executed by a computer processor, implement the following:

in response to a trigger instruction from a current user for a follow control corresponding to a first user in an association user list presented on a page so as to follow the first user, dynamically updating the association user list and displaying the updated association user list; wherein the association user list corresponds to the current user, and dynamically updating the association user list comprises: determining at least one second user according to the first user, and updating the association user list based on the at least one second user; wherein the at least one second user is associated with the first user, and wherein dynamically updating the association user list and displaying the updated association user list comprise:

updating and immediately displaying the at least one second user in the association user list based on a preset update animation and a preset presentation position of the at least one second user in the association user list.

* * * * *